United States Patent
Hayashi

(10) Patent No.: US 8,616,556 B2
(45) Date of Patent: Dec. 31, 2013

(54) COMBINED OIL RING

(75) Inventor: Masaki Hayashi, Okaya (JP)

(73) Assignee: Teikoku Piston Ring Co., Ltd., Tokyo (JP)

( * ) Notice: Subject to any disclaimer, the term of this patent is extended or adjusted under 35 U.S.C. 154(b) by 277 days.

(21) Appl. No.: 12/427,228

(22) Filed: Apr. 21, 2009

(65) Prior Publication Data
US 2009/0273142 A1    Nov. 5, 2009

(30) Foreign Application Priority Data

Apr. 30, 2008 (JP) ................................ 2008-118240

(51) Int. Cl.
| F16J 9/06 | (2006.01) |
| F16J 9/00 | (2006.01) |
| F16J 9/12 | (2006.01) |
| B60T 11/236 | (2006.01) |
| F02F 5/00 | (2006.01) |

(52) U.S. Cl.
USPC ............ 277/488; 277/435; 277/467; 277/472

(58) Field of Classification Search
USPC ................. 277/434, 435, 467, 472–475, 488
See application file for complete search history.

(56) References Cited

U.S. PATENT DOCUMENTS

| 2,656,228 | A | * | 10/1953 | Marien | 92/160 |
| 2,693,398 | A | | 11/1954 | Anderson | 309/45 |
| 3,627,333 | A | * | 12/1971 | Hill | 277/478 |
| 3,759,148 | A | * | 9/1973 | Geffroy | 92/160 |
| 3,831,952 | A | * | 8/1974 | Geffroy | 277/447 |
| 5,564,699 | A | * | 10/1996 | Lawrence et al. | 277/497 |
| 5,603,512 | A | * | 2/1997 | Lawrence et al. | 277/446 |
| 5,618,048 | A | * | 4/1997 | Moriarty et al. | 277/489 |
| 5,779,244 | A | * | 7/1998 | Moriarty et al. | 277/311 |
| 7,077,402 | B2 | * | 7/2006 | Katumaru et al. | 277/434 |
| 2006/0113730 | A1 | * | 6/2006 | Suzuki et al. | 277/434 |

FOREIGN PATENT DOCUMENTS

| GB | 1125031 | 12/1968 |
| JP | 50-94311 | 7/1975 |
| JP | 04-088261 | 3/1992 |
| JP | 05-231540 | 9/1993 |
| JP | 08-240266 | 9/1996 |
| JP | 2007-009971 | 1/2007 |

OTHER PUBLICATIONS

Extended European Search Report dated Aug. 24, 2009, issued on the European patent Application No. 09251112.0.
Notice of Reasons for Rejection issued in counterpart application No. 2008-118240 by the Japanese Patent Office on Mar. 21, 2012 with English translation (8 pages).

* cited by examiner

Primary Examiner — Vishal Patel
Assistant Examiner — Nicholas L Foster
(74) Attorney, Agent, or Firm — Kratz, Quintos & Hanson, LLP

(57) ABSTRACT

A combined oil ring includes an oil ring having upper and lower rails formed integrally at an outer circumferential side of the oil ring to slide on a cylinder wall; a coil expander installed at an inner circumferential side of the oil ring to force the oil ring radially outwards; and a side rail installed at an upper side of the oil ring and having no torsion along an axial direction of the oil ring.

4 Claims, 4 Drawing Sheets

COMBINED OIL RING

BACKGROUND OF THE INVENTION

1. Field of the Invention

The present invention relates to a combined oil ring utilized in internal combustion engines, and relates in particular to a combined oil ring with low oil consumption.

2. Description of the Related Art

A compression ring functioning mainly as a gas seal; and an oil control ring functioning mainly to control the thickness of the oil film on the wall surface of the cylinder bore are mounted on a piston in an internal combustion engine. The oil control ring is mainly a steel combined oil ring with a spacer expander and separate upper and lower rails; or a steel combined oil ring with an integrated upper and lower rail structure and having a coil expander. These oil control rings control the thickness of the oil film on the cylinder wall by pressing the rail section against the inner wall surface of the cylinder bore by the expander to scrape off oil on the inner wall surface of the cylinder bore.

In the case of the combined oil ring with an integrated upper and lower rail structure, oil loss occurs via the gap because the gap positions on the upper and lower rails are at the same or nearby positions along the periphery. In other words, the oil mist that passed through the gap of the lower rail and the oil remaining on the cylinder wall due to the gap of the lower rail tend to easily pass through the gap of the upper rail and enter the combustion chamber. This oil loss phenomenon is particularly drastic when the gaps of the upper and lower rails are aligned with each other since the combustion chamber reaches a negative pressure during deceleration where there is an engine braking effect. Also, the sealing on the upper side of the piston ring groove is weak in the combined oil rings with an integrated upper and lower rail structure so that oil loss occurs in the clearance between the upper surface of the ring groove and the upper surface of the oil ring. This oil loss phenomenon becomes especially drastic during deceleration where engine braking occurs, because the combustion chamber reaches a negative pressure.

Technology for preventing oil loss due to pumping effect is described in Japanese Patent Non-examined Publication No. 50-94311 for a combined oil ring in which a belleville spring contacting the upper surface of the oil ring and the upper surface of the ring groove is mounted on the upper side of the oil ring. Technology for preventing oil loss during high loads is described in Japanese Patent Non-examined Publication No. 4-88261 for a combined oil ring with low tensile force and thin width in which side rails are mounted above and below the spacer expander, the bottom surface of the spacer expander is flat, and the side rail on the lower side acts no radial force substantially. Technology for providing a high tensile force on the upper and lower surfaces of the ring groove and the inner circumferential surface of the cylinder, and high conformability on the inner circumferential surface of the cylinder is described in Japanese Patent Non-examined Publication No. 5-231540 for a combined oil ring in which side rails are mounted at the top and bottom of the support ring, and a coil expander is mounted on the inner circumferential side of the support ring.

The technology disclosed in Japanese Patent Non-examined Publication No. 50-94311 has the problem that the belleville spring restricts the oil ring and impedes the oil ring movement, which is sometimes a factor causing oil consumption to worsen. The technology disclosed in Japanese Patent Non-examined Publication No. 4-88261 and Japanese Patent Non-examined Publication No. 5-231540 contains no oil ring having upper and lower rails formed integrally at the outer circumferential side of the oil ring to slide on the cylinder wall. Moreover, the side rail on the upper side is pressed against the upper surface of the ring groove so that poor conformability of the upper side rail on the inner circumferential surface of the cylinder due to carbon sludge deposits, as well as wear at the contact portion between the side rail pressing section and the side rail sometimes inhibit the oil control function.

SUMMARY OF THE INVENTION

An object of the present invention is to reduce oil consumption in a combined oil ring including an oil ring having upper and lower rails formed integrally at an outer circumferential side of the oil ring to slide on a cylinder wall.

According to an aspect of the present invention, the combined oil ring includes an oil ring having upper and lower rails formed integrally at an outer circumferential side of the oil ring to slide on a cylinder wall; a coil expander installed at an inner circumferential side of the oil ring to force the oil ring radially outwards; and a side rail installed at an upper side of the oil ring and having no torsion along an axial direction of the oil ring.

The gaps of the oil ring and the side rail are preferably mutually offset from each other along the circumference.

At least one of the gaps of the oil ring and the side rail is preferably an oblique gap along the radius. The oblique gap along the radius here means a gap with a gap shape formed of the opposite end surfaces of the oil ring that are positioned at an angle relative to the normal line of the circle of the cylinder bore inner circumference that contacts the outer circumference of the oil ring when the oil ring is installed in the cylinder. The same is also true for the side rail. The gaps of the oil ring and the side rail are preferably oblique gaps along the radius and preferably face mutually opposite from each other.

The radial thickness of the side rail is preferably larger than the radial thickness of the oil ring.

The side rail preferably possesses a slight radial pressing force against the cylinder wall.

The present invention uses the side rail capable of closing the gap of the oil ring and therefore can reduce oil leakage from the gap and lower oil consumption. Moreover, the side rail can possess a smaller mass than the oil ring, and compared to the coil expander can possess a smaller outward force on the surface of the cylinder bore. Therefore, when the piston lowers during engine braking where the combustion chamber reaches a negative pressure, the side rail is raised by the negative pressure and inertial force, and is easily pressed against the upper surface of the ring groove. The side rail consequently closes the clearance between the surface of the cylinder bore and the outer circumferential surface of the piston so that the quantity of oil pumped up into the combustion chamber can be reduced and oil consumption can therefore be smaller. Moreover, oil ring movement is not obstructed because there is no torsion in the side rail along the axial direction of the oil ring. Also, the coil expander does not press the side rail against the upper surface of the ring groove so that there is no interference with oil control functions of the combined oil ring even if deposits such as carbon sludge occur on the upper surface of the ring groove.

Offsetting the gaps of the oil ring and side rail along the circumference is effective in reducing oil consumption. The gap positions are preferably offset from each other by 180 degrees, and a rotation preventing member may be added to the side rail.

Setting at least one of gaps of the oil ring and the side rail as an oblique gap along the radius will narrow the oil path of the gap and so is effective in reducing oil consumption. Setting the gaps of the oil ring and the side rail as oblique gaps along the radius and making them face mutually opposite from each other is particularly effective in lowering oil consumption even further. In other words, the oil path through the gap is narrowed and is effective in reducing oil consumption even if the oil ring and/or the side rail rotates during operation and the gap positions align with each other.

Making the radial thickness of the side rail larger than the radial thickness of the oil ring serves to make the side rail completely close the gap of the oil ring and is therefore effective in lowering oil consumption.

The sealing with the outer circumference can be improved if the side rail possesses a slight radial pressing force against the cylinder wall. Moreover, the rotation of the side rail can be prevented and therefore aligning with the gap of the oil ring can be prevented. Setting the gap dimensions to 0<L1−L2≤3 mm where L1 is the gap dimension while the side rail is in the free state, and L2 is the gap dimension during assembly of the side rail will prove adequate for providing the side rail with a slight expansive force. A slight expansive force of the side rail increases little friction. The side rail may also be set so that there is no radial pressing force on the cylinder wall.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
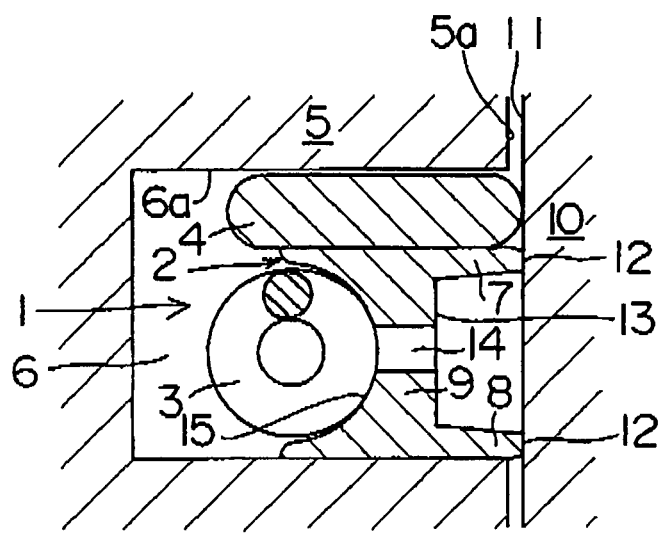
FIG. 1 shows an embodiment of this invention and is a longitudinal cross sectional view showing the state where the piston on which the combined oil ring is mounted is inserted into the cylinder.
Figure 2:
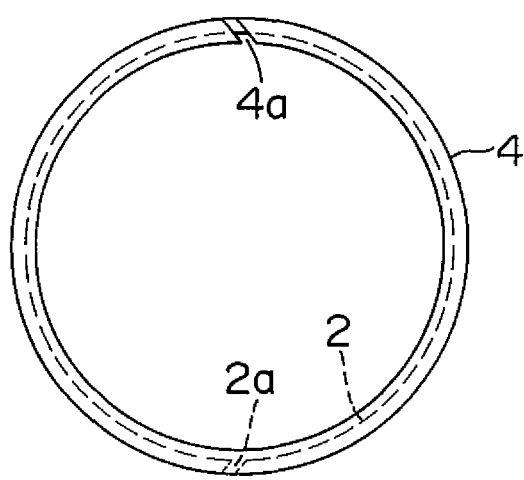
FIG. 2 is a plan view showing the oil ring and the side rail.

A combined oil ring 1 is made up of an oil ring 2, a coil expander 3, and a side rail 4. The combined oil ring 1 is mounted on a ring groove 6 of a piston 5.

The oil ring 2 is a steel ring having an approximately I-shaped cross section and including an oblique gap 2a along the radius. The oblique gap 2a along the radius is a gap with a gap shape formed of the opposite end surfaces of the oil ring 2 that are positioned at an angle relative to the normal line of the circle of a cylinder 10 bore inner circumference that contacts the outer circumference of the oil ring 2 when the oil ring 2 is installed in the cylinder 10. The oil ring 2 includes a pair of upper and lower rails 7 and 8 extending along the circumference, and a straight, thin-walled web 9 connecting the pair of upper and lower rails 7 and 8 and extending along the circumference. The outer circumferential surfaces of the upper and lower rails 7 and 8 respectively make up sliding surfaces 12 that contact the inner circumferential surface 11 of the cylinder 10. The upper and lower rails 7 and 8 and the web 9 form an outer circumferential groove 13. Oil scraped on the inner circumferential surface 11 of the cylinder 10 by the lower rail 8 drops directly into the oil pan. Oil scraped by the upper rail 7 moves from the outer circumferential groove 13 to the inner circumferential side of the oil ring 2 by way of multiple window holes 14 formed at intervals along the circumference on the web 9, and then moves by way of an oil path (not shown in the drawing) formed on the piston 5 and drops into the oil pan.

An inner circumferential groove 15 is formed from the upper and lower rails 7 and 8 and the web 9. The coil expander 3 is mounted in this groove 15. The coil expander 3 is made such that a wire material is wound in a coil form and it is formed into a ring shape. The coil expander 3 applies a pressing force to the oil ring 2 outwards along the radius to make the outer circumferential sliding surface 12 of the oil ring 2 to contact the inner circumferential surface 11 of the cylinder.

The side rail 4 is installed on the upper side of the oil ring 2. The side rail 4 is a ring-shaped thin steel plate possessing no torsion along the axis of the oil ring 2, and includes an oblique gap 4a along the radius. The oblique gap 4a along the radius is a gap with a gap shape formed of the opposite end surfaces of the side rail 4 that are positioned at an angle relative to the normal line of the circle of the cylinder 10 bore inner circumference that contacts the outer circumference of the side rail 4 when the side rail 4 is installed in the cylinder 10. The gap 4a of the side rail 4 and the gap 2a of the oil ring 2 are formed facing mutually opposite from each other, and are also formed shifted 180 degrees offset from each other along the circumference. The side rail 4 has a larger radial thickness than the radial thickness of the oil ring 2. The axial width of the side rail 4 is preferably made as thin as possible within a range that will not cause the function of the piston ring to deteriorate. The side rail 4 possesses a slight radial pressing force against the inner circumferential surface 11 of the cylinder. The outer circumferential surface of the side rail 4 is formed in a barrel-faced shape. However, this outer circumferential shape may also be other shapes such as a rectangular or a taper shape.

In the combined oil ring 1 configured as described above, the side rail 4 can completely close the gap 2a of the oil ring 2 so that oil leakage from the gap 2a is prevented and oil consumption is lowered. When the piston 5 lowers during engine breaking where the combustion chamber reaches a negative pressure, the side rail 4 is raised by inertial force and negative pressure, and easily pressed up against the upper surface 6a of the ring groove 6. The side rail 4 consequently closes the clearance between the outer circumferential surface 5a of the piston and the inner circumferential surface 11 of the cylinder so that less oil is pumped up into the combustion chamber, and oil consumption can be reduced.

Figure 3:
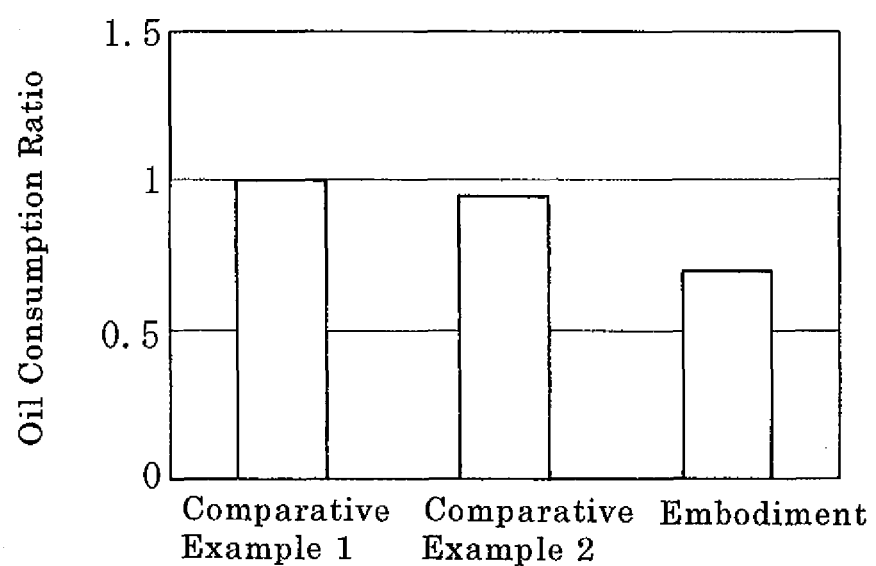
FIG. 3 is a graph showing the results from the oil consumption test.
Figure 4:
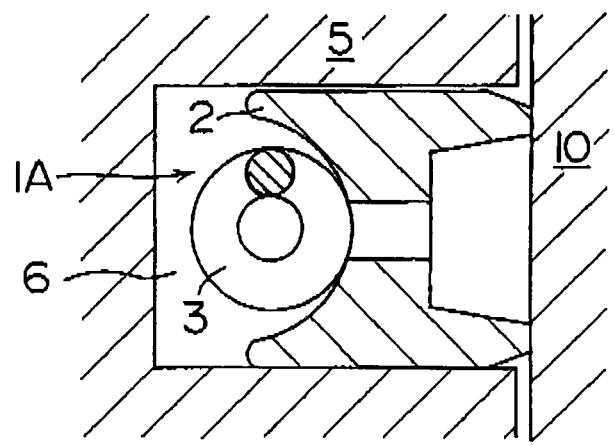
FIG. 4 is a longitudinal cross sectional view showing the state where the piston on which the combined oil ring of the comparative example 1 is mounted is inserted into the cylinder.
Figure 5:
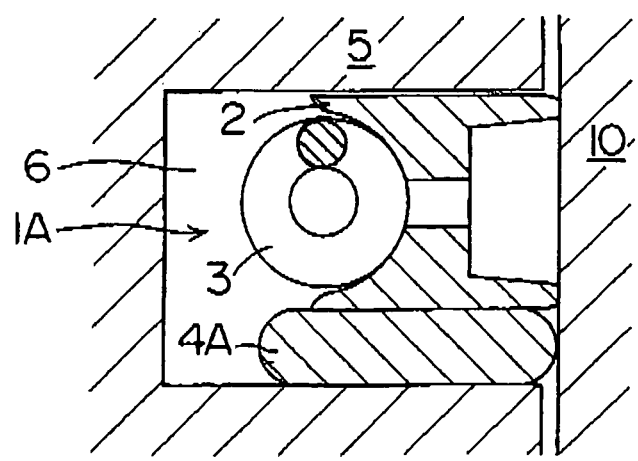
FIG. 5 is a longitudinal cross sectional view showing the state where the piston on which the combined oil ring of the comparative example 2 is mounted is inserted into the cylinder.

Results from performing an oil consumption test are described next. A gasoline engine with four in-line cylinders of diameter 86 millimeters was subjected to excessive driving operation assuming engine braking and the oil consumption quantities were compared (See FIG. 3). The comparative example 1 (See FIG. 4) is a conventional combined oil ring 1A with a coil expander. The comparative example 2 (See FIG. 5) is a combined oil ring 1A with a side rail 4a on the lower side. The embodiment and the comparative example 2 utilized a side rail whose axial width is one-third that of the axial width of the oil ring. The oil consumption per unit of time in the combined oil ring of the present invention was improved by approximately 30 percent compared to the conventional combined oil ring of the comparative example 1. The improvement in the comparative example 2 was slight compared to the comparative example 1.

The invention claimed is:

1. A sealing assembly comprising a combined oil ring, a piston, and a cylinder, wherein the piston has a ring groove with solely one radial depth with the shape of the entire ring groove being uniform and with an upper and lower surface perpendicular to an axial direction of travel of the piston, and the combined oil ring is mounted on the ring groove of the piston which is installed in the cylinder, and the combined oil ring includes:

an oil ring having upper and lower rails formed integrally at an outer circumferential side of the oil ring to slide in the axial direction of travel on a cylinder wall of the cylinder;

a coil expander installed at an inner circumferential side of the oil ring to force the oil ring radially outwards towards the cylinder wall; and a side rail, having a side rail gap, installed along an upper side of the oil ring and arranged on the upper side such that the coil expander does not press the side rail against an upper surface of the ring groove and a clearance is provided between an upper surface of the side rail and the upper surface of the ring groove, wherein the side rail possesses a smaller mass than the oil ring, has an overall radial thickness larger than the overall radial thickness of the oil ring, and has a slight radial pressing force on the cylinder wall provided by having a change in a dimension of the side rail gap being $0 < L1-L2 \leq 3$ mm, where $L1$ is the gap dimension while the side rail is in the free state, and $L2$ is the gap dimension when the side rail is mounted on the ring groove of the piston in the cylinder, and the side rail completely closes of an oil ring gap provided in the oil ring, and when the piston lowers during engine braking of an engine in which the assembly is installed, where the combustion chamber reaches a negative pressure, the side rail is raised by the negative pressure and is pressed against the upper surface of the oil ring groove, and consequently closes the clearance between the surface of the cylinder wall and the outer circumferential surface of the piston.

2. The combined oil ring as claimed in claim 1, wherein the oil ring gap and the side rail gap are located at positions mutually offset from each other along the circumference.

3. The combined oil ring as claimed in claim 1, wherein at least one of the oil ring gap and the side rail gap is an oblique gap along the radius.

4. The combined oil ring as claimed in claim 1, wherein the oil ring gap and the side rail gap are oblique gaps along the radius, and face mutually opposite from each other.

* * * * *

UNITED STATES PATENT AND TRADEMARK OFFICE
CERTIFICATE OF CORRECTION

PATENT NO. : 8,616,556 B2  
APPLICATION NO. : 12/427228  
DATED : December 31, 2013  
INVENTOR(S) : Masaki Hayashi Page 1 of 1

It is certified that error appears in the above-identified patent and that said Letters Patent is hereby corrected as shown below:

In the Claims

In Claim 1, column 6, line 1:

Change "wail" to --wall--.

In Claim 1, column 6, line 7:

Delete "of".

Signed and Sealed this
Fifteenth Day of April, 2014

Michelle K. Lee
*Deputy Director of the United States Patent and Trademark Office*